US010419931B1

(12) United States Patent
Sohail et al.

(10) Patent No.: US 10,419,931 B1
(45) Date of Patent: Sep. 17, 2019

(54) SECURITY FOR NETWORK COMPUTING ENVIRONMENT USING CENTRALIZED SECURITY SYSTEM

(71) Applicant: EMC IP Holding Company LLC, Hopkinton, MA (US)

(72) Inventors: Mohamed Sohail, New Cairo (EG); Stephen Todd, Shrewsbury, MA (US); Said Tabet, Natick, MA (US); Khaled Ahmed, New Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 179 days.

(21) Appl. No.: 15/246,816

(22) Filed: Aug. 25, 2016

(51) Int. Cl.
*H04W 12/06* (2009.01)
*H04L 29/06* (2006.01)
*G06F 8/65* (2018.01)

(52) U.S. Cl.
CPC .............. *H04W 12/06* (2013.01); *G06F 8/65* (2013.01); *H04L 63/0823* (2013.01); *H04L 63/1425* (2013.01)

(58) Field of Classification Search
CPC ...... H04W 12/06; G06F 8/65; H04L 63/0823; H04L 63/1425
See application file for complete search history.

(56) References Cited

U.S. PATENT DOCUMENTS 7,877,621 B2 1/2011 Jacoby et al.
8,316,237 B1* 11/2012 Felsher ................. H04L 9/0825
380/282
8,543,247 B2 9/2013 Boss et al.
8,769,355 B2 7/2014 Scott et al.
8,779,921 B1* 7/2014 Curtiss ................. G08B 25/009
340/506
9,020,802 B1 4/2015 Florissi et al.
(Continued)

FOREIGN PATENT DOCUMENTS

WO 2012061663 A2 5/2012

OTHER PUBLICATIONS

Khalil et al (Khalil, "Wireless Sensor Network for Internet of Things," cs.NI, Jun. 27, 2016, pp. 1-6).*
(Continued)

*Primary Examiner* — Luu T Pham
*Assistant Examiner* — James J Wilcox
(74) *Attorney, Agent, or Firm* — Ryan, Mason & Lewis, LLP

(57) ABSTRACT

Systems, methods, and articles of manufacture comprising processor-readable storage media are provided for implementing security for a network environment using a centralized smart security system. For example, a method includes implementing a network comprising a plurality of network devices which collectively generate data that is utilized by a computing system to execute an application, and implementing a centralized security system as a computing node within the network to manage security operations within the network and to establish secured and trusted communications between the network devices and the computing system. The network devices may comprise wireless sensor devices operating in a wireless sensor network, wherein computing system executes an IoT (Internet of Things) application which processes the data that is generated by the wireless sensor devices.

17 Claims, 7 Drawing Sheets

(56) References Cited

U.S. PATENT DOCUMENTS

| | | | |
|---|---|---|---|
| 9,031,992 B1 | 5/2015 | Florissi et al. | |
| 9,154,948 B2* | 10/2015 | Khare | H04L 63/0492 |
| 9,158,843 B1 | 10/2015 | Florissi et al. | |
| 9,268,938 B1 | 2/2016 | Aguayo Gonzalez et al. | |
| 9,361,175 B1 | 6/2016 | Bose et al. | |
| 9,503,422 B2* | 11/2016 | Al-Khowaiter | H04L 67/1097 |
| 9,509,707 B2 | 11/2016 | Patne et al. | |
| 9,860,257 B1 | 1/2018 | Kumar et al. | |
| 10,097,572 B1* | 10/2018 | Sohail | H04L 63/1425 |
| 2004/0010699 A1* | 1/2004 | Shao | G06F 21/6245 |
| | | | 713/189 |
| 2005/0076198 A1* | 4/2005 | Skomra | H04L 9/321 |
| | | | 713/156 |
| 2005/0228916 A1* | 10/2005 | Telesco | G06F 9/542 |
| | | | 710/200 |
| 2006/0020784 A1* | 1/2006 | Jonker | G06F 21/10 |
| | | | 713/157 |
| 2006/0026683 A1* | 2/2006 | Lim | H04L 63/1416 |
| | | | 726/23 |
| 2007/0113225 A1* | 5/2007 | Felts | G06F 8/65 |
| | | | 717/172 |
| 2008/0091975 A1 | 4/2008 | Kladko et al. | |
| 2012/0089514 A1* | 4/2012 | Kraemling | G06F 21/43 |
| | | | 705/42 |
| 2013/0159550 A1* | 6/2013 | Vasseur | H04W 40/248 |
| | | | 709/242 |
| 2013/0304652 A1* | 11/2013 | Onda | G06F 21/10 |
| | | | 705/71 |
| 2014/0020075 A1* | 1/2014 | Bhagavatula | G06F 21/445 |
| | | | 726/7 |
| 2014/0215207 A1* | 7/2014 | Datta | H04L 63/10 |
| | | | 713/158 |
| 2014/0230055 A1 | 8/2014 | Boehl | |
| 2014/0244836 A1 | 8/2014 | Goel et al. | |
| 2014/0277801 A1* | 9/2014 | Cioraca | G05F 1/70 |
| | | | 700/292 |
| 2014/0286354 A1* | 9/2014 | Van De Poel | G06F 9/542 |
| | | | 370/463 |
| 2015/0039882 A1* | 2/2015 | Watanabe | H04L 63/0428 |
| | | | 713/153 |
| 2015/0180894 A1* | 6/2015 | Sadovsky | G06F 3/0481 |
| | | | 726/22 |
| 2015/0195296 A1 | 7/2015 | Vasseur et al. | |
| 2015/0229654 A1 | 8/2015 | Perier | |
| 2015/0310195 A1 | 10/2015 | Bailor et al. | |
| 2015/0317475 A1 | 11/2015 | Aguayo Gonzalez et al. | |
| 2016/0014158 A1* | 1/2016 | Schrecker | H04L 63/0869 |
| | | | 726/1 |
| 2016/0037436 A1* | 2/2016 | Spencer | H04W 48/12 |
| | | | 370/338 |
| 2016/0050279 A1 | 2/2016 | Pahng | |
| 2016/0078230 A1* | 3/2016 | Silverstone | G06F 21/53 |
| | | | 713/2 |
| 2016/0080406 A1* | 3/2016 | Sadovsky | G06F 3/0481 |
| | | | 726/23 |
| 2016/0112374 A1 | 4/2016 | Branca | |
| 2016/0173511 A1* | 6/2016 | Bratspiess | H04L 41/145 |
| | | | 726/23 |
| 2016/0261465 A1* | 9/2016 | Gupta | H04L 12/2816 |
| 2016/0337127 A1* | 11/2016 | Schultz | H04W 4/70 |
| 2017/0005808 A1* | 1/2017 | Gunti | H04L 9/3268 |
| 2017/0093907 A1* | 3/2017 | Srivastava | H04L 63/1416 |
| 2017/0096123 A1* | 4/2017 | Gennermann | B60R 25/241 |
| 2017/0134173 A1* | 5/2017 | Kern | H04L 9/3268 |
| 2017/0180380 A1* | 6/2017 | Bagasra | H04L 63/101 |
| 2017/0310482 A1 | 10/2017 | Reed et al. | |
| 2017/0344047 A1* | 11/2017 | Cioraca | G05F 1/70 |
| 2018/0054490 A1* | 2/2018 | Wadhwa | G06F 9/45558 |
| 2018/0167812 A1* | 6/2018 | Nagarajamoorthy | |
| | | | H04W 12/06 |
| 2018/0275642 A1* | 9/2018 | Tajima | G01D 3/08 |
| 2018/0337785 A1* | 11/2018 | Sanciangco | H04L 9/3226 |

OTHER PUBLICATIONS

Arias et al "Privacy and Security in Internet of Things and Wearable Devices," IEEE Transactions on Multi-Scale Computing Systems, vol. 1, No. 2, Apr.-Jun. 2015, pp. 99-109.*

Paul et al "Centralized Security System Based on IoT, International Journal of Research in Advance Engineering," vol. 2, Issue 3, May-Jun. 2016, pp. 15-20.*

H. Bai et al., "Wireless Sensor Network for Aircraft Health Monitoring," China Communications, Feb. 2005, pp. 70-77.

Capgemini Consulting, "Securing the Internet of Things Opportunity: Putting Cybersecurity at the Heart of the IoT," Sogeti High Tech, Feb. 12, 2015, 17 pages.

Sebastian Ong, "NFC Technology for Smart Wearables in the Payment and Transport Market," IOT Asia, Mar. 30, 2016, 27 pages.

U.S. Appl. No. 15/175,630 filed in the name of Mohamed Sohail et al. Jun. 7, 2016 and entitled "Security for Network Computing Environment Based on Power Consumption of Network Devices."

U.S. Appl. No. 15/165,437 filed in the name of Eslam ElNakib et al. May 26, 2016 and entitled "Analytics-Based Internet of Things Security Platform."

Andy Patrizio, "IoT Security Issues: How to Secure the Network," http://www.datamation.com/security/iot-security-issues-how-to-secure-the-network.html, Jun. 7, 2016, 2 pages.

Searchsecurity, "Big Data Analytics: New Patterns Emerge for Security," http://searchsecurity.techtarget.com/feature/Big-data-analytics-New-patterns-emerge-for-security, Jun. 2013, 7 pages, vol. 15, No. 5.

GSM Association, "Understanding the Internet of Things (IoT)," Connected Living, Jul. 2014, 15 pages.

Gartner's, "Gartner's 2014 Hype Cycle for Emerging Technologies Maps the Journey to Digital Business," http://www.gartner.com/newsroom/id/2819918, Aug. 11, 2014, 5 pages.

Lynn Price, "Big Data and Actionable Analytics: Is it All Hype?" https://securityintelligence.com/big-data-and-actionable-analytics-is-it-all-hype/, Jun. 12, 2013, 4 pages.

IDC, "Market in a Minute: Internet of Things," http://www.idc.com/downloads/idc_market_in_a_minute_iot_infographic.pdf, 2014-2020, 1 page.

IEEE Standards Association, "P2413—Standard for an Architectural Framework for the Internet of Things (IoT)," https://standards.ieee.org/develpo/project/2413.html, May 4, 2016, 1 page.

cisco.com, "Internet of Things (IoT)," http://www.cisco.com/c/en/us/solutions/internet-of-thing/iot-products.html, May 4, 2016, 2 pages.

ISO/IEC JTC 1, "Internet of Things (IoT)," Preliminary Report, 2014, 17 pages.

abiresearch.com, "More Than 30 Billion Devices Will Wirelessly Connect to the Internet of Everything in 2020," https://www.abiresearch.com/press/more-than-30-billion-devices-will-wirelessly-conne/, May 9, 2013, 1 page.

mfrontiers.com, "mFinity IoT," http://www.mfrontiers.com/mfinity-iot-overview/, May 18, 2016, 2 pages.

gartner.com, "IT Glossary," http://www.gartner.com/it-glossary/, May 4, 2016, 3 pages.

V.K. Vavilapalli et al., "Apache Hadoop Yarn: Yet Another Resource Negotiator," Proceedings of the 4th Annual Symposium on Cloud Computing (SOCC), Article No. 5, Oct. 2013, 16 pages.

International Telecommunication Union, "Series Y: Global Information Infrastructure, Internet Protocol Aspects and Next-Generation Networks: Next Generation Networks—Frameworks and Functional Architecture Models," Recommendation ITU-T Y.2060, Jun. 2012, 22 pages.

The Security Ledger, "Pentagon Looks to Analog Monitoring to Secure IoT," Oct. 1, 2015, 7 pages.

Virta Laboratories Inc., "Virta Labs Introduces PowerGuard," http://www.eecs.umich.edu/eecs/about/articles/2015/VirtaLabs.html, Aug. 12, 2015, 2 pages.

* cited by examiner

US 10,419,931 B1

SECURITY FOR NETWORK COMPUTING ENVIRONMENT USING CENTRALIZED SECURITY SYSTEM

FIELD

The field relates generally to network computing and, in particular, to security mechanisms for network computing systems.

BACKGROUND

The Internet of Things (IoT) is a term that refers to a network computing system in which physical things such as devices, objects, and other things, etc., are equipped with unique identifiers, network connectivity, and other embedded technologies, which allows such devices, objects, and things to sense, communicate, interact, and send/receive data over one or more communications networks (e.g., Internet, etc.) without requiring human-to-human or human-to-computer interaction. For an IoT application, a "thing" may include any object that can be assigned an IP address and have the capability to transfer data over a communications network. IoT technology is considered to be a key enabler for many emerging and future "smart" applications and, consequently, there is expected to be an exponential increase in the number of network connected devices, objects, and autonomous things, which are connected over a communications network such as the Internet. For example, a "smart" IoT application can be implemented using a wireless sensor network (WSN) comprising a network of wireless sensor nodes that cooperatively sense and control a given application environment using machine-to-machine (M2M) communication. As a result of the expected exponential increase in the number of network connected devices for smart IoT applications, network security will become an increasingly problematic issue, especially for RFID (Radio Frequency Identification) networks and wireless networks which are being widely implemented.

SUMMARY

Embodiments of the invention include systems and methods for implementing security for a network environment using a centralized smart security system. For example, one embodiment includes a method which comprises implementing a network comprising a plurality of network devices that collectively generate data which is utilized by a computing system to execute an application, and implementing a centralized security system as a computing node within the network to manage security operations within the network and to establish secured and trusted communications between the network devices and the computing system. In one example embodiment, the network devices comprise wireless sensor devices operating in a wireless sensor network and wherein the computing system executes an IoT application using the data that is generated by the wireless sensor devices.

The centralized security system performs security related operations, including, but not limited to: preventing a network device from operating within the network and communicating with the computing system when the network device is determined to be exhibiting anomalous behavior; denying a request from a network device to perform an operation when the operation is deemed to not be trusted by the centralized security system; extracting device identifying information from a request received from a network device and denying the request when the identity of the network device cannot be validated by the centralized security system based on the extracted device identifying information; invalidating a signed certificate of the network device, which was issued by the centralized security system to the network device, if the identity of the network device is not validated based on the extracted device identifying information; and obtaining a patch from the computing system, and automatically installing the patch in one or more of the network devices operating in the network.

Other embodiments of the invention include, without limitation, computing systems and articles of manufacture comprising processor-readable storage media.

DETAILED DESCRIPTION

Embodiments of the invention will be described herein with reference to systems and methods for implementing a centralized smart security system within a network (e.g., local area network, wide area network) of network-connected devices (e.g., wireless sensor devices and wireless actuators), which collectively generate data that is utilized by a computing system to execute an application (e.g., IoT application). As explained in further detail below, a centralized smart security system is configured to manage security-related operations within the network and to establish secured and trusted communications between the network devices and a computing system of a server provider (e.g., IoT cloud computing system). For example, a centralized smart security system centralizes secured and trusted communications between an IoT cloud computing system and a network of IoT devices. The centralized smart security system provides a customized smart security layer between the network devices and the computing system to abstract and centralize security-related measurements and operations within the network environment, and to automate and implement security policies within the secured and trusted network environment established and managed by the centralized smart security system. The term "smart" as used herein in the context of a centralized smart security system (or smart security agent) means that the centralized smart security system essentially operates automatically and autonomously to perform security related functions within a device network without human intervention.

It is to be understood that the term "computing system" as used herein with respect to various embodiments are intended to be broadly construed, so as to encompass, for example, a private or public computing system (e.g. cloud computing system), or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, any application that implements a data storage system, or combination of data storage systems, including, but not limited to storage area network (SAN) systems, direct attached storage (DAS) systems, Hadoop Distributed File System (HDFS), as well as other types of data storage systems comprising clustered or distributed virtual and/or physical infrastructure.

Figure 1:
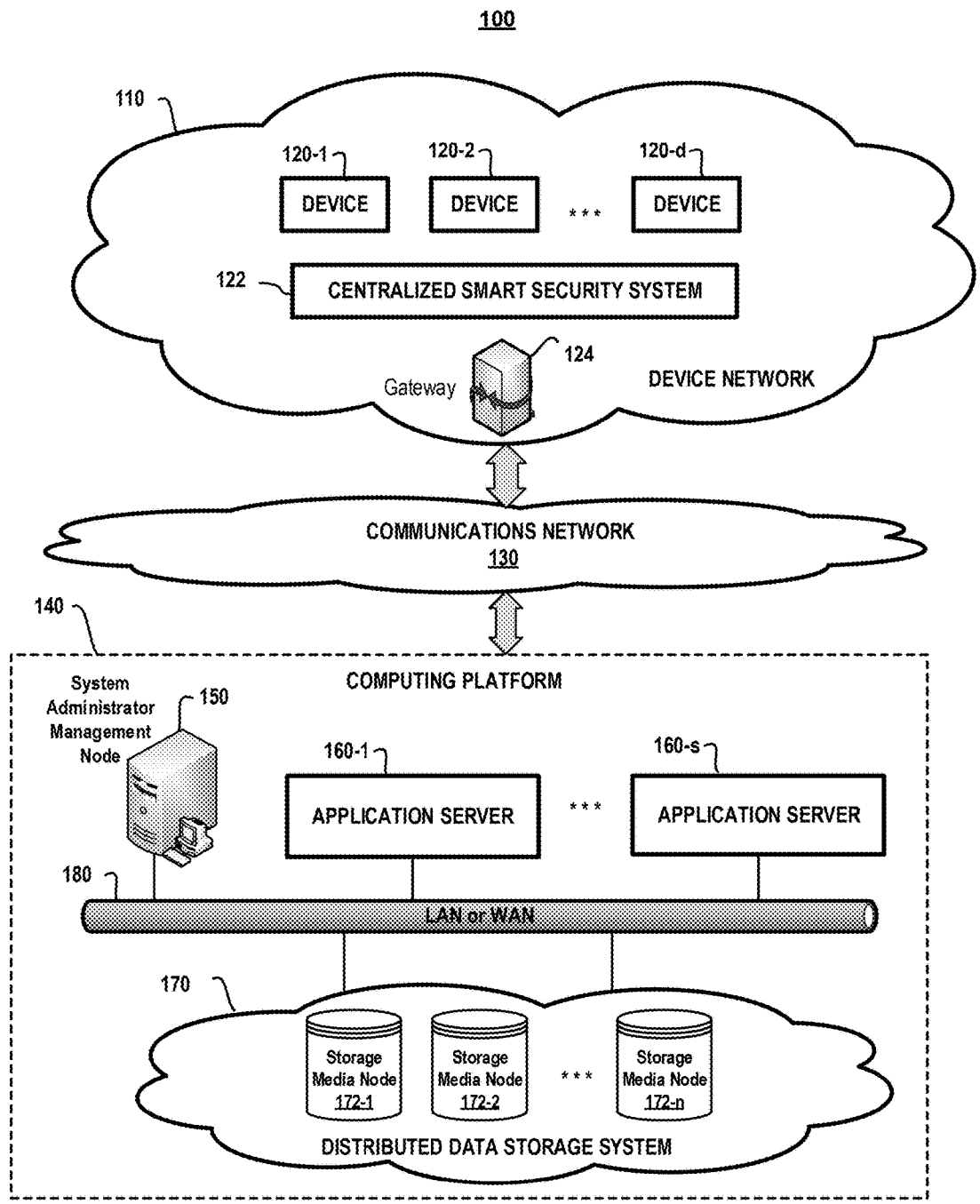
FIG. 1 is a high-level schematic illustration of a computing system which implements a centralized smart security system to manage security functions within a network of devices, according to an embodiment of the invention.

FIG. 1 is a high-level schematic illustration of a computing system 100 which implements a centralized smart security system to manage security functions within a network of devices, according to an embodiment of the invention. In particular, the computing system 100 comprises a device network 110, a communications network 130, and a computing platform 140 which is coupled to the device network 110 via the communications network 130. The device network 110 comprises a plurality of computing devices 120-1, 120-2, . . . , 120-d (collectively referred to as network computing devices 120), a centralized smart security system 122, and a gateway 124. The computing devices 120 collectively generate data that is transmitted to, and utilized by, the computing platform 140 to execute one or more applications. The centralized smart security system 122 is configured to manage security-related operations within the device network 110 and to establish secured and trusted communications between the computing devices 120 and the computing platform 140.

The computing platform 140 comprises a system administrator management node 150 (or management node 150), a plurality of application server nodes 160-1, . . . , 160-s (collectively referred to as application server nodes 160), and a distributed data storage system 170. The application server nodes 160 run one or more applications that process the data that is generated by the computing devices 120 of the device network 110 to provide one or more services. The distributed data storage system 170 comprises a plurality of storage media nodes 172-1, 172-2, . . . , 172-n (collectively referred to as storage media nodes 172). The various system components 150, 160 and 170 communicate over a platform communications network 180 (e.g., a wide area network (WAN), a local area network (LAN), etc.).

In one embodiment of the invention, the device network 110 comprises a wireless network in which the computing devices 120 comprise network-connected wireless sensor devices, as well as actuators, which are implemented for a given IoT application. In general, each wireless sensor device comprises a power management module, a sensor, a microcontroller, and a transceiver (e.g., wireless transceiver). The power management module controls and manages power needed to operate the sensor device. The sensor of a given wireless sensor device is configured to transform captured signals (e.g., light, vibration, heat, chemical, etc.) into electrical signals that are processed by the microcontroller of the sensor node to generate sensor data. The transceiver of the wireless sensor device transmits the sensor data to a target system. In one embodiment of the invention, the power management modules of the wireless sensor devices are configured to monitor and report power consumption/usage of the wireless sensor devices to the centralized smart security system 122, wherein the power consumption/usage data of the wireless sensor devices is utilized by the centralized smart security system 122 to detect for anomalous behavior and activity of wireless sensor devices in the device network 110.

The communications network 130 may comprise, for example, a global computer network such as the Internet, a WAN, a LAN, a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 130 in some embodiments therefore comprises combinations of multiple different types of communications networks each comprising network devices configured to communicate using Internet Protocol (IP) or other related communication protocols. The communications network 130 comprises intermediate points (such as routers, switches, etc.) and other elements that form a network backbone to establish communication paths and enable communication between network endpoints.

In one embodiment of the invention, the computing system 100 of FIG. 1 comprises an IoT cloud computing system that is configured to support one or more application domains including, but not limited to, healthcare, home and building, retail, energy, manufacturing, transportation, logistics, and media application domains. In addition to sensor nodes, the computing devices 120 may comprise various types of devices, objects and things such as mobile computing devices, smart phones, RFID devices, smart sensors, smart appliances, and other types of smart devices, objects and things that are configured to support IoT applications for one or more application domains. The computing platform 140 manages and processes IoT data received from the various computing devices 120 across one or more application domains.

By way of example, for the healthcare domain, the computing devices 120 can be utilized for remote health monitoring and emergency notification. Health monitoring devices include blood pressure and heart monitors, pacemakers, hearing aids, etc. Insurance companies can utilize IoT data to automatically track and reconcile insurance claims and ensure proper payments are made to claimants. Furthermore, for the home and building domain, the computing devices 120 can be implemented to monitor and control mechanical, electrical and electronic systems that are utilized in residential, commercial or industrial buildings. For example, home and building automation systems can implement IoT sensors and actuators to automatically control lighting, heating, ventilation, air conditioning, appliances, communication systems, entertainment and home security devices, etc.

Moreover, for the energy domain, IoT sensors and actuators can be implemented, for example, in energy consuming devices (e.g., switches, power outlets, light bulbs, etc.) and be equipped to communicate with power supply companies to provide IoT data that enables the power supply companies to effectively balance power generation and energy usage through "smart grids." For example, IoT devices would enable power supply companies to acquire and process IoT data with regard to energy usage in various regions and automatically control and manage production and distribution of electricity in such regions, e.g., control and manage distribution devices such as transformers. In addition, for the manufacturing domain, IoT devices can be used for network control and management of manufacturing equipment or manufacturing process control.

For an IoT application, the computing platform 140 performs data processing and storage functions to support one or more IoT network applications. In particular, the application server nodes 160 of the computing platform 140 are configured to host and manage one or more IoT applications, which are used by multiple, simultaneously connected users and/or entities in one or more application domains. Depending on the implementation of the computing platform 140, the application server nodes 160 are configured to, e.g., execute business logic, execute scripts and services to query databases, and perform other computing functions that are needed to host and deliver IoT applications and services to multiple end users, service providers, and/or organizations. In one embodiment of the invention, the application server nodes 160 and distributed data storage system 170 are implemented, for example, using a cluster of server nodes that reside in a single facility (e.g., data center facility of private company) or a cluster of server nodes that reside in two or more data center facilities or remote locations (distributed over a cloud network) of a given service provider.

The distributed data storage system 170 is implemented using any type of data storage system, or combination of data storage systems, including, but not limited to a SAN system, a NAS system, HDFS, an object-based system, as well as other types of data storage systems comprising clustered or distributed virtual and/or physical infrastructure. The storage media nodes 172 comprise groups (e.g., storage arrays) of data storage devices such as HDDs (hard disk drives), Flash storage devices, disk storage devices, SSD (solid state drive) devices, or other types and combinations of non-volatile memory and associated drive types. The storage media nodes 172 may comprise homogeneous storage pools, heterogeneous storage pools, or a combination of homogeneous and heterogeneous storage pools. Homogeneous data storage pools have a single drive type (e.g., Flash, HDD, etc.), whereas heterogeneous data storage pools can consist of different drive types. In another embodiment of the invention, some or all of the storage media nodes 172 comprise direct attached storage devices, such as internal HDDs, etc., which are directly attached to the application server nodes 160.

In one embodiment, the centralized smart security system 122 is configured as one more computing nodes within the device network 110 to manage security-related operations within the device network 110 and to establish secured and trusted communications between the network devices 120 within the device network 110 and between the network devices 120 and the computing platform 140. In another embodiment, the centralized smart security system 122 is implemented as a virtual machine running on one or more computing nodes within the device network 110. The centralized smart security system 122 provides a customized smart security layer between the network of devices 120 and the computing platform 140 to abstract and centralize security-related measurements and operations within the network environment, and to automate and implement security policies within a secured and trusted device network 110 established and managed by the centralized smart security system 122.

More specifically, the centralized smart security system 122 is configured to detect for potential security threats based on predefined security-related criteria (e.g., security compliance policies and parameters) to optimize security of the network devices 120 in the device network 110, and detect for potential security threats and anomalous device behaviors by analyzing network device data and/or network activity data that is collected over time by the centralized smart security system 122. In addition, the centralized smart security system 122 is configured to analyze, create and update network device profiles and learned patterns of device behaviors, which are indicative of benign and anomalous behaviors of the network devices, or of certain classes/types of network devices. In addition, the centralized smart security system 122 is configured to send and receive security updates to and from the service provider of the computing platform 140, and to automatically install security patches and/or firmware updates in the network devices 120 to harden the security of the device network 110.

Furthermore, the centralized smart security system 122 is configured to control operations of the registered network devices 120 within the device network 110. For example, when the centralized smart security system 122 detects that a given network device 120 is exhibiting anomalous behavior, or is requesting the execution of a given operation/task that is not trusted, the centralized smart security system 122 can temporarily block the given network device 120 from operating within the device network 110 or otherwise prevent the network device 120 from executing a non-trusted or suspicious operation. Security related operations and functions of the centralized smart security system 122 will be explained in further detail below.

The management node 150 implements methods for registering the centralized smart security system 122 with the computing platform 140, wherein the registration process allows the centralized smart security system 122 to operate as a trusted entity of the computing platform 140 and establish and manage a trusted and secured networking environment for the network devices 120. The centralized smart security system 122 implements methods for registering trusted network devices within the device network 110 on behalf of the computing platform 140. The registration process results in the assignment of unique device IDs to trusted network devices that are registered by the centralized smart security system 122 and allowed to operate within the secured device network 110. The unique device IDs are used to associate network device data (e.g., power consumption data) and other relevant data (which is received and stored by the centralized smart security system 122) with the corresponding network devices 120.

Figure 2:
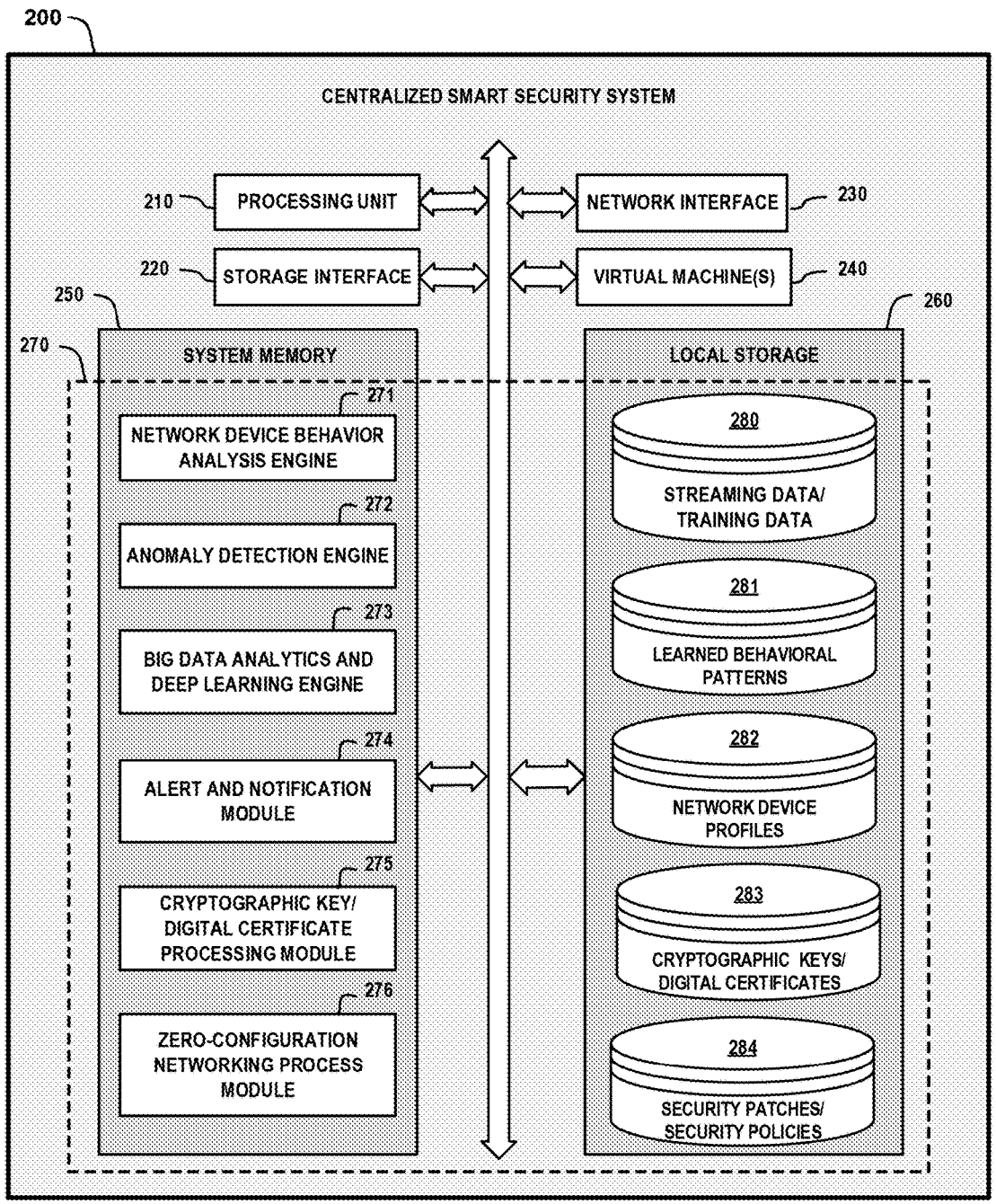
FIG. 2 schematically illustrates an embodiment of centralized smart security system which can be implemented in the computing system of FIG. 1, according to an embodiment of the invention.

FIG. 2 schematically illustrates an embodiment of a centralized smart security system which can be implemented in the computing system 100 of FIG. 1, according to an embodiment of the invention. In one embodiment, the centralized smart security system 200 of FIG. 2 comprises a server node that operates within the device network 110. The centralized smart security system 200 comprises a processing unit 210, storage interface circuitry 220, network interface circuitry 230, virtual machine(s) 240, system memory 250, and local storage 260. In addition, the centralized smart security system 200 comprises a smart security agent 270 according to one embodiment of the invention, which comprises a network device behavior analysis engine 271, an anomaly detection engine 272, a big data analytics and deep learning engine 273, an alert and notification module 274, a cryptographic key/digital certificate processing module 275, a zero-configuration networking ("Zeroconf") process module 276, a database of streaming data and training data 280, a database of learned behavioral patterns 281, a database of network device profiles 282, a directory of cryptographic keys and issued digital certificates 283, and a repository of security patches and security policies 284.

In one embodiment, the system components 271, 272, 273, 274, 275, and 276 of the smart security agent 270 comprise software programs that generate and/or utilize various types of information stored in the databases 280, 281, 282, 283, and 284. Furthermore, in one embodiment, the functionality of the smart security agent 270 can be distributed over multiple server nodes within a given device network, wherein some or all of the system components 271, 272, 273, 274, 275, 276 execute on multiple network nodes to implement the centralized smart security system 200 (or 122, FIG. 1). Moreover, in a distributed environment, the server nodes share the information stored in their local databases 280, 281, 282, 283 and 284, to implement a distributed smart security agent 270. In other embodiments, the centralized smart security system 200 (or 122, FIG. 1) can be implemented with two or more autonomous smart security agents 270 which control and manage security related functions within different subnetworks within the device network 110.

The processing unit 210 comprises one or more processors that are configured to process program instructions and data to execute a native operating system (OS) and application programs that run on the centralized smart security system 200. The processing unit 210 comprises one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient, than is possible for executing such functions in software running on a more general purpose processor.

The storage interface circuitry 220 enables the processing unit 210 to interface and communicate with the system memory 250, local storage 260, and other off-infrastructure storage media, using one or more standard communication and/or storage control protocols to read data from or write data to volatile and non-volatile memory/storage devices (e.g., system memory 250 and local storage 260). The network interface circuitry 230 enables the centralized smart security system 200 to interface and communicate with a network and other system components. The network interface circuitry 230 may comprise conventional transceivers of a type well known in the art (e.g., network interface cards, I/O adaptors, etc.).

The virtual machine(s) 240 are implemented using a hypervisor platform which executes on the application server 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on the physical infrastructure, e.g., CPUs and/or storage devices, of the centralized smart security system 200. An example of a commercially available hypervisor platform that may be used to implement portions of an IoT computing system in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.).

The system memory 250 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processing unit 210 to execute a native operating system and one or more applications hosted by the centralized smart security system 200, and to temporarily store data that is utilized and/or generated by the native OS and application programs running on the centralized smart security system 200. The local storage 260 comprises any type of non-voltage storage media including, but not limited to, HDDs, Flash storage devices, disk storage devices, SSD devices, or other types and combinations of non-volatile memory and associated drive types.

In one embodiment, the system components 271, 272, 273, 274, 275 and 276 of the smart security agent 270 shown in FIG. 2 comprise software programs that may be stored in the local storage 260 and loaded into the system memory 250 for execution by the processing unit 210. In this regard, the system memory 250 and local storage 260 and other memory or storage media as described herein, which have program code tangibly embodied thereon, are examples of what are more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The smart security agent 270 receives and processes streaming data from the plurality of network devices 120 (e.g., wireless sensor devices) within the device network 110 (e.g., wireless senor network), and stores the received streaming data in the database of streaming data and training data 280. For example, the streaming data comprises power consumption/usage data which is monitored and reported by each of the network devices 120 in the device network 110. The streaming data may comprise other information such as network activity and communication patterns between the network devices 120 within the device network 110. The received streaming data is persistently stored in the database 280 and associated with respective network devices 120 via device IDs that are assigned to the network device 120 when the network devices are registered with the centralized smart security system. The stored streaming data is processed by one or more of the various computing engines 271, 272 and 273 to detect for anomalous behavior and network attacks within the device network 110.

For example, the network device behavior analysis engine 271 implements methods to process network device operational data and/or network activity data which is received from the network devices 120 and device network 110 (and stored in the database 280) to determine if the operations/activities of a given network device are normal or abnormal at a given time for a given application. For example, in one embodiment, the network device behavior analysis engine 271 processes the collected data in the database 280 to detect for vulnerabilities, security breaches, anomalous device behaviors, device malfunctions, etc., based on device operational data (e.g., power usage/consumption data, resource usage data) of the network devices. In another embodiment, the network device behavior analysis engine 271 processes network device operational data, in conjunction with other types of network-related information regarding network activity, communication patterns between different network devices, behaviors of network devices, etc., to detect for vulnerabilities, security breaches, anomalous device behaviors, device malfunctions, etc., within the device network.

For example, in one embodiment, the device network 110 may comprise one or more nodes (e.g., the gateway node 124) which implement a network activity and communications monitoring system that is configured to collect and stream certain types of network-related information to the centralized smart security system 200. Such network-related information is utilized in conjunction with the device operational data (e.g., power consumption data, resource usage data, etc.) to detect for anomalous behaviors and activities within the device network 110. For example, such network-related information includes, but is not limited to, monitored network activity in device network 110, monitored communication patterns between different computing devices 120 in the device network 110, monitored behaviors of the computing devices 120 and other nodes in the device network 110, etc.

In one embodiment, the network device behavior analysis engine 271 utilizes information in the learned behavioral patterns database 281 and/or the network device profiles database 282 to process the streamed data 280 to detect for anomalies associated with abnormal device behaviors. In particular, the network device profiles database 282 comprises a collection of "device profiles" for each type of network device 120 that is implemented in the device network 110. In one embodiment, the network device profiles comprise vendor-created profiles that provide information regarding normal operation (e.g., normal ranges of power usage) of various types of vendor-specific network devices (e.g., wireless sensors) for different applications/uses of the network devices. The vendor-created device profiles provide an initial baseline of normal (expected) device operation metrics which can be compared against the actual device operational data (e.g., average power consumption over a period of time) of a given network device 120 within the device network 110 to determine if the given network device 120 is operating normally or abnormally (e.g., consuming a normal or abnormal amount of power for a given application).

In addition, in one embodiment, the smart security agent 270 is configured to update the vendor-specific network device profiles 282 over time by building or otherwise learning expected/abnormal behavior profiles for each of the network devices 120 within the device network 110 based on historical operational data that is reported by each of the different network device 120 over time for different use scenarios. The learned network device behavioral profiles can be stored in the learned behavioral patterns database 281 and used for anomaly detection, or otherwise stored in the device profiles database 282 as updated device profiles that are used for anomaly detection.

The anomaly detection engine 272 implements methods to process streaming data (e.g., network activity data, power consumption data, etc.) received from the network devices 120 and the device network 110 to detect for possible anomalous activity related to security breaches (intrusion detection) such as sniffer attacks, denial-of-service attacks, man-in-the-middle attacks, etc., using behavioral patterns that are stored in the learned behavioral patterns database 281. In accordance with embodiments of the invention, the anomaly detection engine 272 implements intrusion detection methods in which operational data (e.g., power consumption/usage) as reported by the computing devices is one of a plurality of metrics that are used to detect anomalous network activity and behaviors based on the behavioral patterns stored in the learned behavioral patterns database 281.

For example, a sniffer attack refers to a process that is used by attackers (e.g., hackers, malware, etc.) to capture network traffic using a sniffer application, wherein the sniffer application can capture network packets and access/analyze data within the network packets for unauthorized purposes (e.g., capture sensitive network information, such as passwords, account information etc.). A denial-of-service (DoS) attack refers to a process that is used by attackers to render a given computing device or network resource unavailable for its intended use. For example, a DoS attack may cause a network device to send an excessive amount of false packets (referred to as flooding) into the network, or fully consume resources of a computing device to starve the computing device of resources for its normal operation, etc. A man-in-the-middle attack refers to a process that is used by an attacker to intercept all relevant messages passing between two computing devices and inject new messages, which gives the attacker the ability to capture and manipulate sensitive information in real-time.

In typical IoT applications that implement a network of wireless sensor devices, for example, the wireless sensors are constrained in power, memory, and processing power. As such, various types of attacks such as outlined above can result in significant, abnormal power consumption or resource consumption (e.g., processor cycles, memory, etc.) of the wireless sensor devices. In this regard, the power consumption and resource consumption behavior of one or more of the network devices can be used to generate signatures or behavior patterns that are maintained in the learned behavioral patterns database 281.

In one embodiment, the learned behavioral patterns database 281 comprises "normal behavior profiles" which comprise signatures or patterns of normal network activities and/or normal network device behavior. In this embodiment, the anomaly detection engine 272 is configured to compare the normal behavior profiles with a current set of streaming data in database 280 to detect certain network activities and device behaviors as being "abnormal" when such network activities and device behaviors deviate from one or more normal behavior profiles by statistically significant amounts.

In another embodiment, the learned behavioral patterns database 281 comprises "abnormal behavior profiles" which comprise signatures or patterns of known abnormal network activities and/or abnormal network device behavior. In this embodiment, the anomaly detection engine 272 is configured to compare the abnormal behavior profiles with a current set of streaming data in database 280 to detect certain network activities and device behaviors that are known to be abnormal when such network activities and device behaviors are determined to positively correspond to one or more abnormal behavior profiles within a predefined statistical range. In another embodiment, the learned behavioral patterns database 281 comprises both normal and abnormal behavior profiles, which are used for anomaly detection.

The big data analytics and deep learning engine 273 implements methods to process a large amount of streaming data and/or training data that is stored in the database of streaming data/training data 280 to generate learned behavior patterns that are stored in the learned behavioral patterns database 281. Big data analytic methods are implemented to mine a massive amount of streaming data that is collected over time (e.g., power consumption data, resource consumption data, network activity data, etc.) and extract meaningful behavioral patterns for the network devices (e.g., sensor devices) operating in a device network based on the streaming data collected over time. Deep learning methods are implemented to extract high-level, complex abstractions as data representations through a hierarchical learning process. Complex abstractions are learned at a given level based on relatively less complex abstractions formulated in a preceding level in the hierarchy. The deep learning methods are used to analyze and learn patterns from massive amounts of raw streaming data that is stored in the database 280 which is primarily unlabeled and un-categorized.

In view of the above, it is to be appreciated that the various data processing engines 271, 272, and 273 can be implemented to detect for various types of anomalous network behaviors, activities, and/or intrusions based on device operational data (e.g., power consumption data, resource consumption data, etc.) alone, or based on device operational data conjunction with other types of data/metrics such as patterns of network communications and other behaviors of computing devices operating within a device network. Depending on the application, the smart security agent 270 can implement one, some, or all of the data processing engines 271, 272, and 273 shown in FIG. 2.

The alert and notification module 274 implements methods for logging a description of potential anomalous activity which is detected by any one of the data processing engines 271, 272, and 273, and sending alerts and notification to a management API of the centralized smart security system 200 for review by a network administrator.

The cryptographic key and digital certificate processing module 275 implements methods for generating and managing cryptographic keys (e.g., public/private (asymmetric) key pairs, symmetric session keys, etc.) and client certificates. As explained in further detail below, the smart security agent 270 generates and utilizes cryptographic keys to securely communicate with and authenticate registered network devices. In one embodiment of the invention, the cryptographic keys comprise SSH (secure shell) keys are that generated using a public key cryptographic protocol.

Moreover, the cryptographic key and digital certificate processing module 275 implements methods for processing requests from network devices for signed digital certificates, and issuing signed certificates to trusted network devices as part of a device registration process. The signed certificates are utilized by the smart security agent 270 for authentication of a trusted network device, and for secured communication with trusted network devices. For example, in one embodiment of the invention, the smart security agent 270 is configured to process requests for SSL (secured sockets layer) certificates received from network devices requesting registration within a secured network that is managed by the central smart security system 200, and to issue signed SSL certificates to registered network devices. The SSL certificates issued to registered (and trusted) network devices are utilized during an SSL communications protocol for device authentication and secured communications with the registered network devices, as will be explained in further detail below. In addition, the cryptographic key and digital certificate processing module 275 implements methods for generating and transmitting certificate signing requests to the computing platform 140 for the smart security agent 270 to obtain a signed digital certificate that is used by the computing platform 140 to authenticate the smart security agent 270 and to establish secured communications between the smart security agent 270 and the computing platform 140. The cryptographic keys and digital certificates that are generated/issued by the smart security agent 270 are maintained in the key/certificate database 283.

The zero-configuration ("Zeroconf") networking process module 276 implements various methods that allow the smart security agent 270 to automatically establish/configure a secured TCP/IP-based device network and publish information (e.g., location of a public SSH key) to network devices or other entities in the secured network environment. As is known in the art, Zeroconf is essentially implemented using three core technologies that allow for (i) the assignment of numeric network addresses for networked devices, (ii) the automatic distribution and resolution of node hostnames, and (iii) the automatic broadcasting and location of network services.

The security patches/security policies database 284 stores security patches that are downloaded by the smart security agent 270 from a cloud computing system. The smart security agent 270 will automatically install the security patches in one or more registered network devices, as needed, to harden the security of the network devices. Moreover, the database 284 maintains various security policies that specify certain suggested or mandated criteria for securing the device network and/or network devices. For example, a given security policy may specify that the network devices should not operate with default passwords. In this regard, the smart security agent 270 can take appropriate action to force a network administrator to change default password of certain network devices with a more complex password. The security policies may be specified by a service provider of the computing platform, for example. The smart security agent 270 is configured to obtain updates to security policies and compliance parameters, etc.

In another embodiment, the smart security agent 270 implements an analytics engine that is configured to provide dynamic trust scoring and associated authentication leveling functionalities for network devices. In particular, the analytics engine is configured to assign trust scores to respective ones of the network devices, and to provide authentication leveling functionality for the network devices based at least in part on the assigned trust scores. The trust scores and associated authentication levels for network devices can be stored as security policies in the database 284 or stored in association with network device profiles in the database 282. In accordance with an authentication leveling functionality, the smart security agent 270 can access the trust score of a given network device to identify a level of authentication to be applied by the smart security agent 270 to the network device when authenticating the network device. The trust score can indicate a target authentication process to be implemented to meet the requisite authentication level, which can be either a light-weight, medium or full authentication process. A lightweight authentication level can be identified based at least in part on a given trust score being above a first threshold, a full authentication level can be identified based at least in part on the given trust score being below a second threshold, and the intermediate authentication level can be identified based at least in part on the given trust score being between the first and second thresholds.

Figure 3:
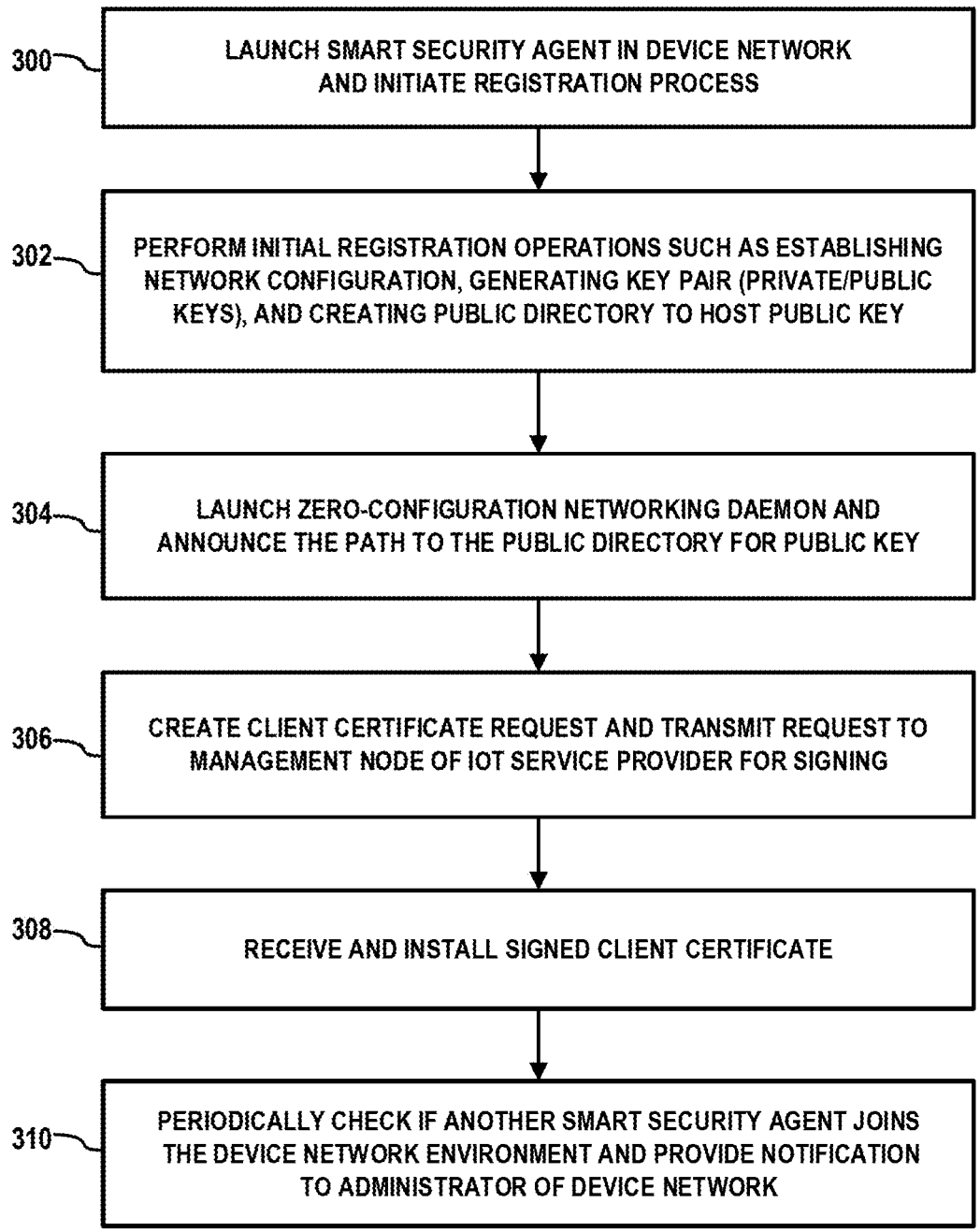
FIG. 3 is a flow diagram of a method for configuring and registering a centralized smart security system that is utilized to manage a trusted and secured network of devices, according to an embodiment of the invention.

FIG. 3 is a flow diagram of a method for configuring and registering a centralized smart security system that is utilized to manage a trusted and secured network of devices, according to an embodiment of the invention. For illustrative purposes, the method of FIG. 3 will be discussed with reference to the embodiments of FIGS. 1 and 2. For example, in the context of the computing system 100 of FIG. 1, the flow diagram of FIG. 3 illustrates an initial registration process that is performed for implementing the centralized smart security system 122 within the device network 110 to manage security-related operations within the device network 110 and to establish secured and trusted communications between the network devices 120 and the computing platform 140. In one embodiment, the method of FIG. 3 can be utilized to register the smart security agent 270 (FIG. 2) with the management node 150 of the computing platform of FIG. 1. The registration process of FIG. 3 can be performed to register a smart security agent 270 within an existing device network or concurrently with setting up a network of network devices.

Referring to FIG. 3, an initial step is to launch the smart security agent 270 within the device network 110 and initiate a registration process with the computing platform 140 (block 300). In one embodiment of the invention, this initial step is manually performed by an administrator of the device network 110. In another embodiment, the registration process is performed automatically by the smart security agent 270. In one embodiment, as noted above, the device network 110 comprises a network of wireless sensor devices and actuators which support a target IoT application that is executed by the computing platform 140. In one embodiment, a registration process comprises initial registration operations such as establishing network configurations for the device network 110, generating cryptographic keys (e.g., public key and private key pair), and creating a public directory to store/host the public key (block 302). These initial registration operations can be performed manually, automatically, or through a combination of manual and automated operations.

In particular, with regard to establishing network configurations, the administrator or the smart security agent 270 establishes a secure network having a certain topology (linear, star, tree, mesh, etc.). The smart security agent 270 is configured as a security manager of the device network 110 to monitor the device network and prevent network devices from joining the secured network in an ad hoc manner and self-organizing into a connected network without first registering with the smart security agent 270 and becoming a "trusted" network device.

Further, as part of the initial registration process, in one embodiment of the invention, the cryptographic key/digital certificate processing module 275 of the smart security agent 270 is invoked to generate a SSH key pair using a public-key cryptographic process to generate a public key and corresponding private key. The network security agent 270 will then create a public directory (e.g., FTP (file transfer protocol) directory to host the SSH public key of the smart security agent 270. As is known in the art, SSH keys provide a mechanism for establishing secure communications between two network devices (e.g., client and severs) using public key cryptography and channel-response authentication. The public directory is accessible by network devices that are registered with the smart security agent 270 to allow the registered network devices to obtain and utilize a copy of the public key for secure communications with the smart security agent 270.

In particular, in the context of establishing secure communications between the smart security agent 270 and a given network device 120 that is registered as a "trusted" device within the device network 110, the network device 120 can encrypt a message with the public key of the smart security agent 270 to ensure that only the holder (smart security agent 270) of the associated private key can decrypt the message. This is because any message encrypted with the public key can only be decrypted with the associated private key. In addition, the public key can be utilized by a registered network device to authenticate that a received message was generated by the holder (smart security agent 270) of the associated private key. This is because any message encrypted with the private key can only be decrypted with the public key.

Another step of the registration process comprises launching a zero-configuration networking daemon of the smart security agent 270 to announce/broadcast the public path to the public directory in which the SSH public key is stored (block 304). This process allows the smart security agent 270 to provide information regarding the location of the SSH public key and allow network devices which join the network, and request registration for trusted status, to obtain a copy of the public key.

Next, the smart security agent 270 will generate a certificate signing request and transmit the request to the management node 150 of the computing platform 140 for signing (block 306). In one embodiment of the invention, the client certificate signing request comprises a message that is sent to the management node 150 of the computing platform to request the signing of the public key and other relevant information of the smart security agent 270. The request is signed using the private key of the smart security agent 270 to prove that the smart security agent 270 has control of the private key that corresponds to the public key included in the certification signing request.

Once the information in the certificate signing request passes a vetting process and domain control is established, the service provider of the computing platform 140 (or any other recognized Certificate Authority utilized by the service provider of the computing platform 140) will sign the public key of the smart security agent 270 so that the public key can be publically trusted. The smart security agent 270 will then receive and install a signed client certificate (block 308) which is received from either the service provider of the computing platform 140 or a trusted, known Certificate Authority utilized by the service provider of the computing platform 140. In one embodiment of the invention, the signed digital certificate comprises a SSL (secure sockets layer) certificate. As is known in the art, a SSL certificate comprise a digital certificate which authenticates the identity of a given entity and encrypts information sent to the given entity using an SSL protocol. In the context of embodiments described herein, a SSL certificate issued to the smart security agent 270 serves to establish the credentials of the smart security agent 270 when communicating with the computing platform 140 of the server provider. When the smart security agent 270 attempts to communicate with a server of the computing platform 140, the SSL certificate of the smart security agent 270 can be utilized to establish a secure connection.

Once the smart security agent 270 is registered with the computing platform 140, the smart security agent 270 can proceed to register network devices to operate within the trusted network environment and perform security-related operations to detect anomalous activity within the trusted network. As part of these security operations, the smart security agent 270 will periodically analyze the environment to determine if another smart security agent has joined the device network environment, and then provide notification (via the alert and notification module 274) to the network administrator of the newly detected smart security agent (block 310). This will allow the network administrator to confirm that the newly detected smart security agent is either (i) a trusted and authorized entity to operate within the device network, or (ii) an unauthorized, malicious entity that has been added to the device network for illicit purposes.

Figure 4:
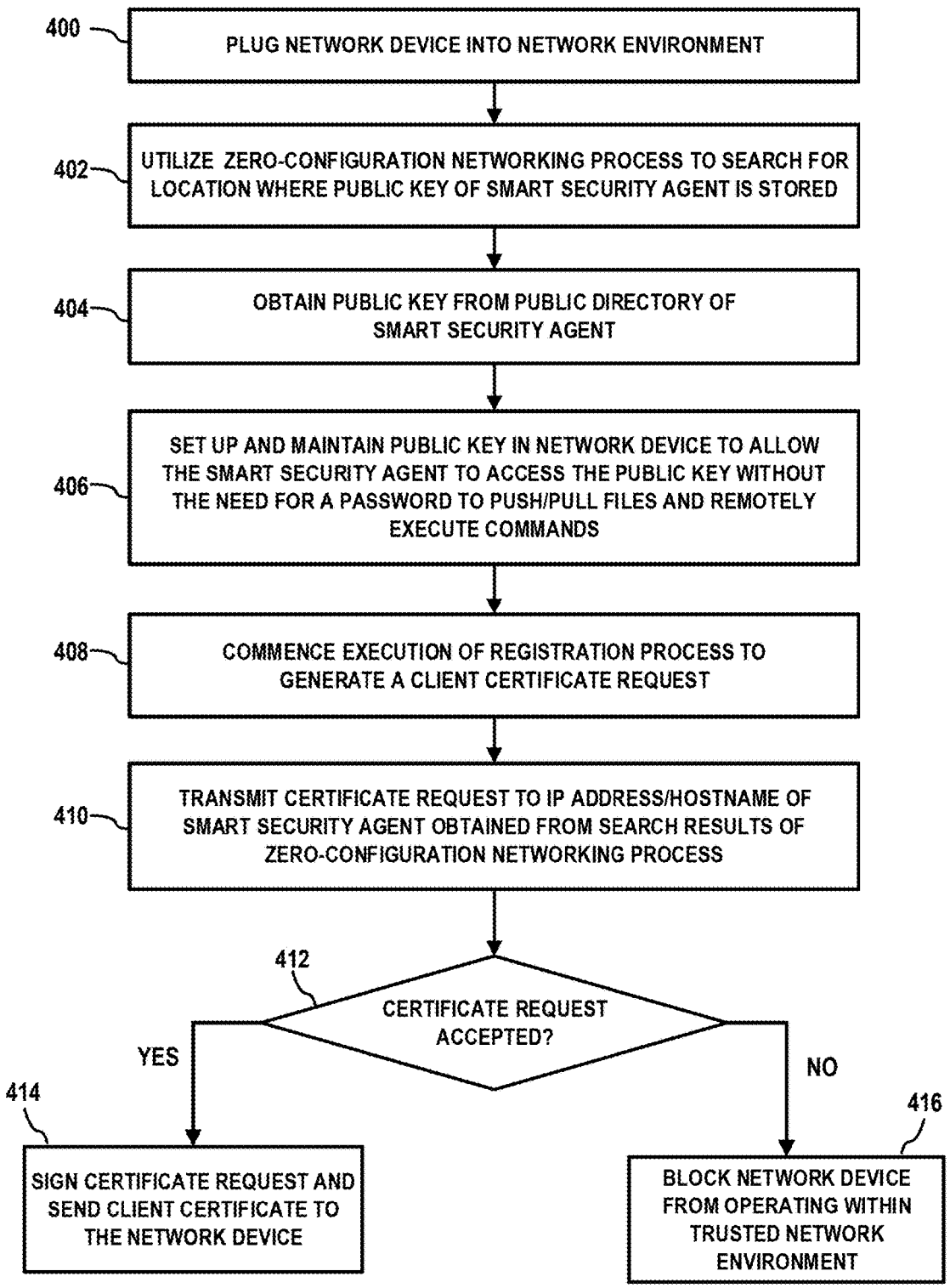
FIG. 4 is a flow diagram of a method for adding a network device into a trusted and secured network of devices which is managed by a centralized smart security system, according to an embodiment of the invention.

FIG. 4 is a flow diagram of a method for adding a network device into a trusted and secured network of devices which is managed by a centralized smart security system, according to an embodiment of the invention. More specifically, FIG. 4 illustrates a method for registering a network device with the smart security agent 270 so that the network device can operate within a trusted and secured device network that is managed by the smart security agent 270. In one embodiment, the method of FIG. 4 is performed when a new network device is added to an existing trusted and secured device network that is currently being managed by the smart security agent 270. In another embodiment, the method of FIG. 4 is performed when the smart security agent 270 is newly added (and registered) within an existing unsecured device network, in which case the existing network devices within the unsecured network proceed to register with the newly added smart security agent 270.

As an initial step, a new network device is added to an existing trusted and secured network environment (block 400). Alternatively, the network device may already be included as part of an existing, unsecured network, which is being converted into a new trusted and secured network by a registered smart security agent. In this regard, the existing network device can be considered as being added to the newly established and configured network environment. In all instances, the newly added network device will utilize a Zeroconf process to search for the location (e.g., public FTP directory) where the public key of smart security agent 270 is stored (block 402). The Zeroconf process is performed to obtain other relevant information such as the IP address and hostname of the smart security agent 270 via mDNS.

The network device will obtain the public key from the public directory of the smart security agent 270 (block 404) and then setup and maintain the public key in way that allows the smart security agent 270 to access the public key from the network device (without the need for a password) to push/pull files and to remotely execute commands (block 406). With this process, the public key (e.g., SSH public key) of the smart security agent 270 resides on the network device, which allows the smart security agent 270 to connect to the network device and "unlock" the network device by using the private key (e.g., private SSH key) of the smart security agent 270 via an SSH protocol agent without the need for a password. The use of the SSH keys allows the smart security agent 270 to automatically authenticate the network device using a SSH key authentication process. For example, when the smart security agent 270 attempts access to the network device, the network device will use the public key to construct and send a challenge to the smart security agent 270. The challenge comprises an encrypted message which is encrypted using the public key of the smart security agent 270. The smart security agent 270 can decrypt the message using the private key and then generate and send a proper response to the network device.

Once the public SSH key of the smart security agent 270 is setup, a registration process is commenced in which the network device generates a client certificate signing request (block 408). In one embodiment of the invention, the network device generates a request for a signed SSL certificate, and sends the request to the IP address/hostname of the smart security agent 270 (block 410). As noted above, the IP address/hostname of the smart security agent 270 comprises information that is obtained as a result of the previous Zeroconf search process (in block 402).

The request for a signed SSL certificate received from the network device is reviewed for acceptance or denial (block 412). If the request is accepted (affirmative result in block 412), the smart security agent 270 will sign the request and send a signed SSL certificate to the network device using a suitable communications protocol (block 414). The issuance of the signed SSL certificate completes the registration process, and the network device is deemed "trusted" and is allowed to begin operating within the secured network environment. The signed SSL certificate is subsequently utilized by the smart security agent 270 and the newly registered network device to communicate in a secure way using an SSL communications protocol.

On the other hand, if the request is not accepted (negative result in bock 412), the network device will be blocked from joining or otherwise operating within the secured network environment (block 416). In one embodiment, the network device will be added to a "black list," which prevents the network device from being added to the secured device network until the network device is removed from the black list. In one embodiment, the decision to accept or reject the request for a signed SSL certificate (in block 412) is made, at least in part, by the network administrator. For example, in one embodiment, all requests for SSL certificates from network devices can be held in a queue, and manually reviewed by the network administrator using a web console connected to the centralized smart security system 122 (FIG. 1). In this regard, the network administrator has the option of accepting or rejecting requests for signed SSL certificates from network devices attempting to register and join the secured device network.

Once a given network device is registered with the smart security agent 270 and has been issued a signed SSL certificate, the given network device is deemed "trusted" can begin operating in the device network and communicating with the smart security agent 270. In one embodiment of the invention, the network devices can communicate with the smart security agent 270 using XML-RPC, which is a remote procedure call (RPC) protocol that utilizes XML (extensible markup language) to encode the calls and utilizes HTTP as a transport mechanism. In another embodiment, communications can be implemented using REST (Representational State Transfer), which implements a stateless, client-server, cacheable communications protocol, as is known in the art.

Figure 5:
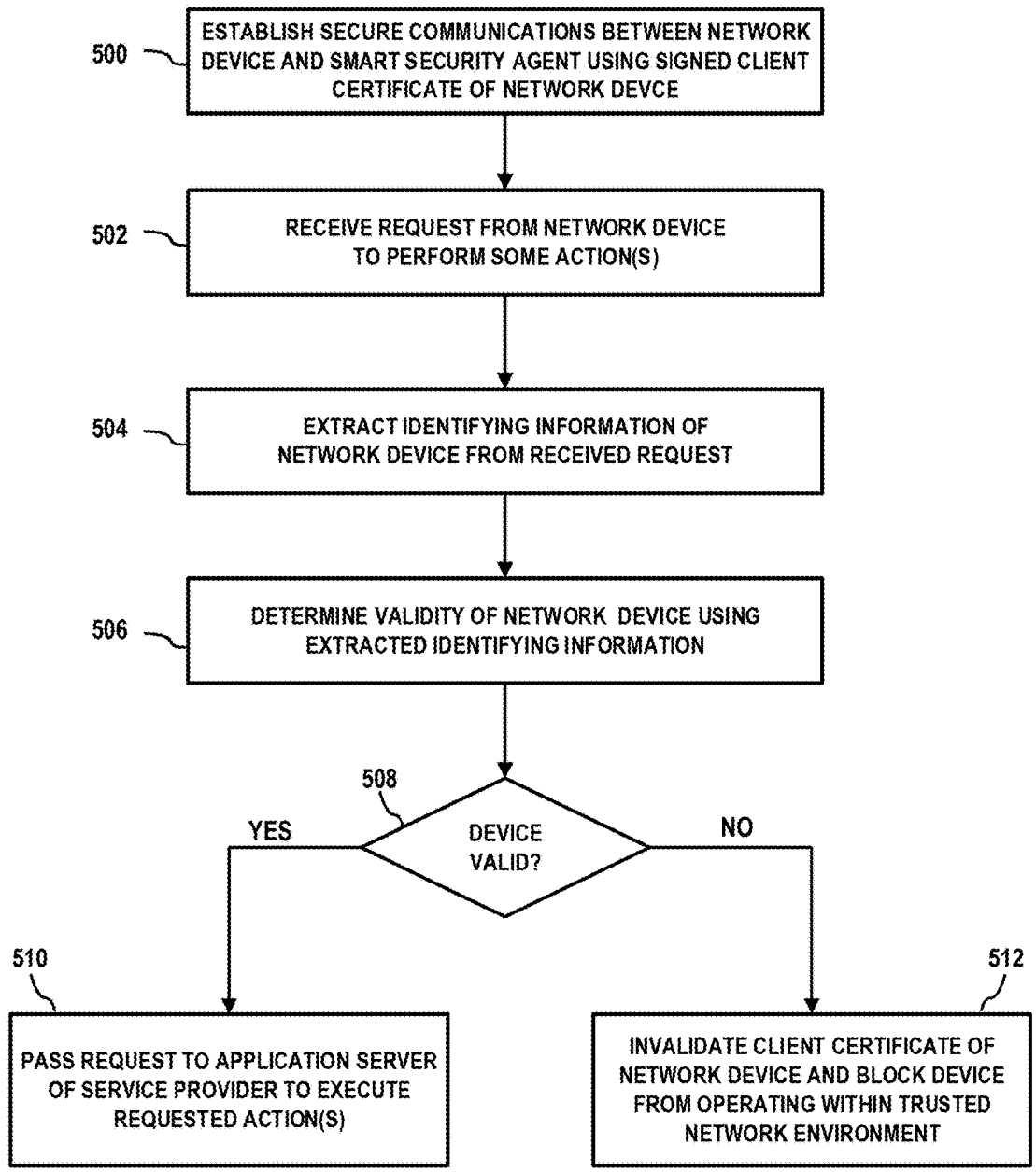
FIG. 5 is a flow diagram of a method for processing a request from a network device in a trusted and secured network of devices which is managed by a centralized smart security system, according to an embodiment of the invention.

The smart security agent 270 operates within the trusted and secured device network as a communication point between the registered network devices and the computing platform 140 of the server provider. For example, FIG. 5 is a flow diagram of a method for processing a request from a network device operating in a trusted and secured network of devices which is managed by a centralized smart security system, according to an embodiment of the invention. More specifically, FIG. 5 illustrates an example process flow in which the smart security agent 270 processes a request received from a registered network device, e.g., a request to access a service or function provided by one or more of the application servers 160 of the computing platform 140, or store/access data to/from the distributed data storage system 170 of the computing platform 140, etc.

As an initial step, a registered network device establishes a secure communications channel with the smart security agent 270 using the signed SSL certificate issued to the registered network device (block 500). In one embodiment, a secured SSL communications channel is generated using a standard SSL protocol. For example, the registered network device connects to the smart security agent 270 and the smart security agent 270 requests that the registered network device identify itself. The registered network device sends a copy of its signed SSL certificate to the smart security agent 270, and the smart security agent 270 checks the SSL certificate against a list of issued SSL certificates to ensure that the SSL certificate is not expired, or revoked, and otherwise still valid. If the SSL certificate is deemed valid, then the smart security agent 270 can create and encrypt a symmetric session key using the SSH private key, and then send the encrypted session key to the registered network device. The registered network device can then decrypt the session key using the public SSH key of the smart security agent 270. The network device and smart security agent 270 then communicate with messages that are encrypted using the session key.

Once the secured SSL communication session is established, the smart security agent 270 will receive a request from the registered network device to perform some requested action (block 502). In one embodiment, the request is encrypted using the session key. As noted above, the request can be implemented using XML-RPC or REST. The request will have some identifying information of the registered network device. For example, in one embodiment, the identifying information comprises a serial number and firmware version of the registered network device. Other types of identifying information can be incorporated within the request. In one embodiment, all requests that are sent from the registered network devices to the smart security agent 270 will include identifying information of the associated network devices.

The smart security agent 270 will then extract the identifying information from the request that is received from the registered network device (block 504). The extracted device identifying information is utilized by the smart security agent 270 to validate the network device (block 506). For example, the smart security agent 270 can validate the network device by comparing the extracted device identifying information of the network device (e.g., serial number, firmware version, etc.) against the corresponding identifying information of associated with the SSL certification of the registered device (as maintained by the security agent 270) to validate the identity of the registered network device. In another embodiment, the smart security agent 270 can send the extracted device identifying information to a cloud computing system of a vendor of the network device to validate the authenticity of the network device.

If the smart security agent 270 determines that the network device is valid (affirmative determination in block 508), the smart security agent 270 will allow the request from the network device to pass to an application server of the computing platform 140 of the service provider to execute the requested actions (block 510). On the other hand, if the smart security agent 270 determines that the network device is not valid (negative determination in block 508), the smart security agent 270 will invalidate the digital certificate (e.g., SSL certificate) of the network device and block the network device from operating within the trusted device network or otherwise sending requests to the computing platform 140 (block 512). The network device will be included in the device "black list" of the smart security agent 270.

Figure 6:
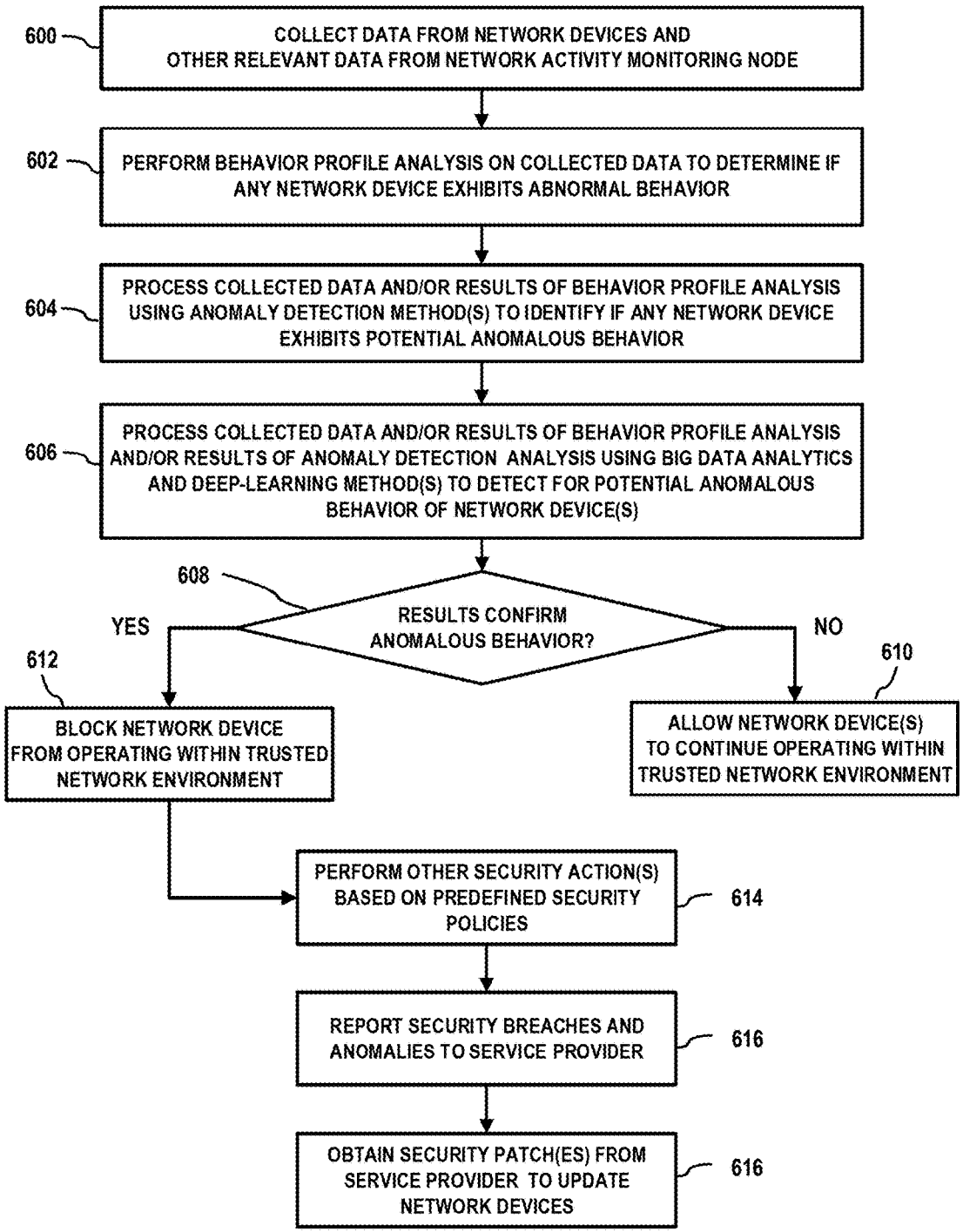
FIG. 6 is a flow diagram of a method for detecting anomalous activity within a trusted and secured network of devices which is managed by a centralized smart security system, according to an embodiment of the invention.

As noted above, the smart security agent 270 will perform various types of security-related operations to detect for potential security threats and anomalous activity within the secured and trusted device network, and update and optimize security measures within the secure network based on information collected from actual detected threats and anomalies. For example, FIG. 6 is a flow diagram of a method for detecting anomalous activity within a trusted and secured network of devices which is managed by a centralized smart security system, according to an embodiment of the invention. In particular, FIG. 6 illustrates an exemplary mode of operation of the smart security agent 270 for detecting anomalous activity within a trusted device network based on data (e.g., power consumption/usage data) reported from the network devices operating within the trusted device network and/or other types of network-related information that is streamed from the trusted device network with regard to, e.g., network device activities, communication patterns between different network devices, behaviors of network devices, etc., according to an embodiment of the invention.

The smart security agent 270 collects device operational data of the network devices (e.g., power consumption data, resource usage data, etc.) that is streamed from the network devices within the trusted device network, as well as any other relevant data indicative of network activity, communication patterns between different network devices, and other behaviors of the network devices, etc., which is streamed from a network activity monitoring node in device network (block 600). The streaming data that is received by the smart security agent 270 from the trusted device network is stored in the streaming data database 280 (FIG. 2).

As a first level of analysis, a behavior profile analysis can be performed on the collected data to determine if any network device within the trusted device network exhibits abnormal behavior (block 602). For example, in one embodiment, this process can be implemented by the network device behavior analysis engine 271 processing the collected network device data (e.g., power consumption data) against learned behavioral patterns of the network devices, which are stored in the learned behavioral patterns database 281 to detect if any network device is exhibiting anomalous behaviors. In another embodiment, the process (block 602) can be implemented by the network device behavior analysis engine 271 processing the collected network device data (e.g., power consumption data) against specified baseline or updated device profiles (e.g., power profiles) of the network devices, which are stored in the network device profiles database 282.

As a second level of analysis, an anomaly detection process can be performed to process the collected streaming data and/or the results of the behavior profile analysis to identify network devices that are exhibiting potential anomalous behavior (block 604). In one embodiment, this process can be implemented by the anomaly detection engine 272 (FIG. 2) processing the collected data against the learned behavioral patterns of the network devices, which are stored in the learned behavioral patterns database 281, to detect for possible anomalous behaviors of one or more network devices based on collected device data (e.g., power consumption data) in conjunction with other relevant data with regard to network activity, communication patterns between different network devices, and other behaviors of the network devices, etc. For example, as noted above, the anomaly detection engine 272 implements methods to process streaming data (e.g., network activity data, power consumption data, etc.) received from the network devices and the trusted device network to detect for possible anomalous activity related to security breaches (intrusion detection) such as sniffer attacks, denial-of-service attacks, man-in-the-middle attacks, etc., using behavioral patterns that are stored in the learned behavioral patterns database 281.

As a third level of analysis, a big data and deep learning analysis can be performed to process (i) the collected streaming data and/or (ii) the results of the behavior profile analysis and/or (iii) the results of the anomaly detection process, to identify network devices that are exhibiting potential anomalous behavior (block 606). In one embodiment, this process can be implemented by the big data analytics and deep learning engine 273 (FIG. 2) processing the collected data against learned behavioral patterns of the network devices, which are stored in the learned behavioral patterns database 281.

In one embodiment, the processing results from one or more of the different levels of anomaly detection (blocks 602, 604, and 606) are collectively processed to make a determination as to whether one or more network devices are exhibiting anomalous behavior (block 608). When no network devices are determined to be exhibiting anomalous behavior (negative determination in block 608), each network device is allowed to continue operating within the trusted device network (e.g., communicating with other network devices, storing data to the backend data storage system 170, etc.) (block 610). On the other hand, when a given network device is determined to be exhibiting anomalous behavior (affirmative determination in block 608), the given network device is blocked from operating within the trusted device network (block 612).

In response to detecting anomalous behavior, the smart security agent may perform other security-related actions based on predefined security policies (block 614). For example, when anomalous behavior is detected, the smart security agent 270 will log a description of the anomaly in a persistent data store. If a severity of the detected anomaly exceeds a predefined threshold, the smart security agent 270 can generate an alarm notification to the network administrator, and take some action based on a fingerprint of the attack. The smart security agent 270 can update a network device profile of a given network device, or class of network devices, in the profiles database 282 to provide samples of anomalous and unexpected behaviors of the network device, or network device class.

Further, in one embodiment, the smart security agent 270 will report breaches of security and detected anomalies and attacks to the service provider of the IoT computing platform 140 (block 616). This allows the IoT cloud server provider to enrich or otherwise update a library with new types of network attacks or anomalous behaviors of network devices which were previously unknown. Moreover, the smart security agent 270 can receive updates from the IoT cloud service provider with regard to newly discovered types of network attacks or anomalous behaviors of network devices which were previously unknown, thereby providing information to the smart security agent 270 which can be used to monitor for such newly discovered types of network attacks and anomalous device behaviors.

Moreover, the smart security agent 270 can obtain security patches from a service provider (e.g., IoT service provider, network device vendor, etc.) which are used to update the firmware of the network devices with enhanced/optimized security features (block 616). While an enterprise network will typically have an IT administrator who monitors each software version and manually applies appropriate security patches to network devices, such process can be tedious in a network of hundreds or thousands of wireless sensor devices and actuators, for example. Moreover, non-enterprise networking environments (e.g., home appliances controlled by an IoT application), an unsophisticated end user (e.g., homeowner) may not be able to monitor the smart home appliance and apply necessary updates/patches to the network devices within the given network environment. In this regard, a smart security agent 270 can be implemented to automatically update the network devices, as needed, with security patches, updated firmware, etc., relieving the network administrator of such responsibilities.

Suspicious behavior of a network device is one of several primary indicators that can be used to detect for potential threats and attacks within a distributed environment of network devices. The smart security agent 270 can be configured to detect and block some requested operation of a given network device if the security agent 270 deems such operation to be suspicious and not trusted, even though there is some probability that the operation is benign and not intended to execute an attack in the device network. For example, one of the most common attacks is a code injection attack, which is performed by an attacker to introduce program code into a vulnerable software program (e.g., firmware) to change the course of execution or otherwise inject fake measurements which can disrupt a control process, or alter the firmware of a network device to perform other harmful tasks. In one embodiment of the invention, the smart security agent 270 is configured to detect for certain tasks/operations performed by network devices which have some probability of being linked to potential network attacks, e.g., rebooting of a network device to implemented new firmware as a potential code injection attack, etc.

Figure 7:
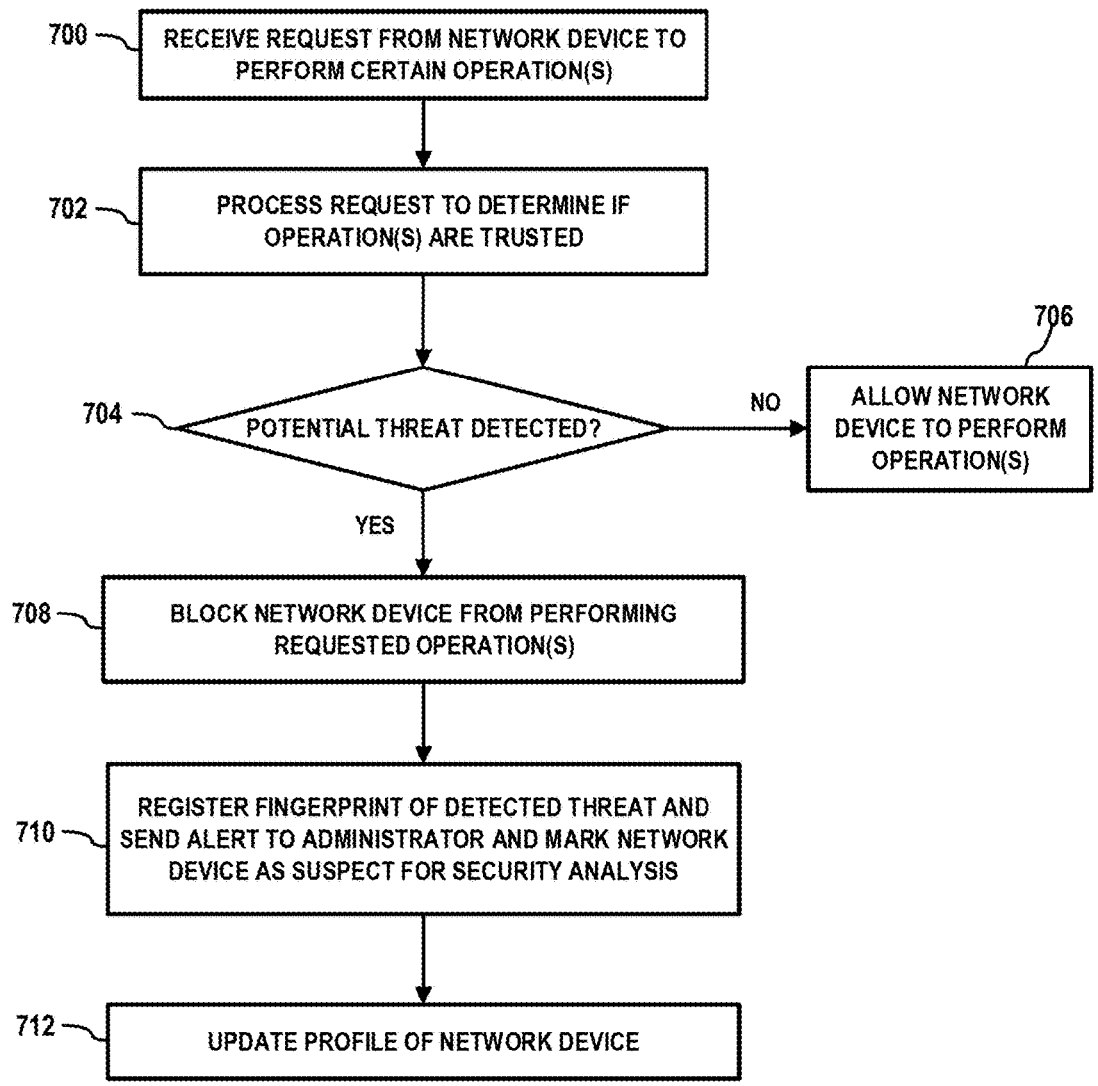
FIG. 7 is a flow diagram of a method for monitoring requested operations of network devices to guard against anomalous activity in a trusted and secured network of devices which is managed by a centralized smart security system, according to an embodiment of the invention.

For example, FIG. 7 is a flow diagram of a method for monitoring requested operations of network devices to guard against anomalous activity in a trusted and secured network of devices which is managed by a centralized smart security system, according to an embodiment of the invention. More specifically, in one embodiment of the invention, FIG. 7 illustrates an exemplary mode of operation of the smart security agent 270 in analyzing requested operations of network devices to determine if there are potential threats to allowing the network devices to perform such functions. When the smart security agent 270 receives a request from a network device to perform a certain operation (block 700), in addition to performing validation operations to validate the identity of the network device (FIG. 5, blocks 504, 506, 508, 510), the smart security agent 270 will process and analyze the request to determine of the requested operation is trusted (block 702).

If the requested operation is deemed trusted where no potential threat is detected (affirmative determination in block 704), then the network device will be allowed to perform the requested operation (block 706). On the other hand, if the requested operation is deemed to be untrusted whereby a potential threat is detected (affirmative determination in block 704), the network device will be blocked from performing the requested operation (block 708). The smart security agent 270 will register the fingerprint of the detected potential threat, mark the network device as "suspect" for a security analysis, and then send an alert (via the alert and notification module 274) to the device network administrator to provide notice of the "suspect" network device (block 710).

A security analysis can then be performed to confirm whether or not the marked network device is indeed a potential threat to the trusted device network. This security analysis can be performed manually by the network administrator, or performed automatically (or semi-automatically) using other anomaly detection methods and/or manual review methods to verify the results of the initial detection. If the results of the security analysis confirm that the given network device is not exhibiting abnormal behavior by virtue of the requested operation that was initially deemed to be untrusted, the network device will be allowed to execute such operation. On the other hand, if the results of the security analysis confirm that the network device was attempting some network attack by virtue of the requested operation that was initially deemed to be untrusted, the network device can be blocked from operating within the network until an additional security check or compliance check can then be performed to rectify the detected abnormal behavior of the network device. During these operations, the device profile of the suspect network device will be updated accordingly (block 712).

It is to be appreciated that there are various advantages to implementing a centralized smart security system for managing and implementing security-related operation of a device network according to embodiments of the invention as discussed herein. For example, embodiments of the invention require secure registration and validation of network devices in a way that prevents device cloning and attacks associated with fake network devices. Indeed, embodiments of the invention prevent fake devices and servers from being added within a secured and trusted network to inject fake measured that can disrupt control processes and execute malicious attacks.

Furthermore, embodiments of the invention enable network devices to be automatically upgraded with new updated firmware and security patches without human intervention. In addition, embodiments of the invention provide a centralized security architecture which takes into account the small form factor of typical network devices which have very little surface area where chips or other devices can be installed to implement complex security functions. Consequently, network devices can be implemented with basic functionality such as reporting, monitoring and alerting via software programming, while provided a centralized smart security system with suitable processing power and resources to establish and manage a secure and trusted device network comprising hundreds or thousands of wireless sensors devices and actuators, for example.

Moreover, embodiments of the invention leverage a large database of device data and network activity information that is collected over time and analyzed using deep learning methods to dynamically learn benign and anomalous behaviors of network devices over time by virtue of the holistic behavior and interplay between network devices within a network environment.

While embodiments of the invention will be described with reference to illustrative computing systems, data storage systems, and associated servers, computers, memory devices, storage devices, and other processing devices, it is to be understood, however, that embodiments of the invention are not restricted to use with the particular illustrative system and device configurations shown. In this regard, it is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
  receiving, by a centralized security system which is configured to operate within a network as a security layer between a computing system and a plurality of network devices comprising sensor devices operating within the network, which collectively generate data that is utilized by a computing system, to manage security operations within the network and establish communications between the network devices and the computing system, device operational data which is streamed from a sensor device operating within the network, wherein the device operational data comprises information regarding at least one of power usage data and resource usage data as reported by the sensor device operating within the network;
  processing, by the centralized security system, the device operational data to detect anomalous behavior of the sensor device operating within the network; automatically preventing, by the centralized security system, the sensor device from operating within the network and sending data to the computing system, in response to the detection of anomalous behavior of the sensor device;
  controlling, by the centralized security system, access to the computing system by the plurality of network devices, wherein controlling access to the computing system comprises:

receiving, by the centralized security system, a digital certificate from a given network device requesting access to the computing system, wherein the digital certificate authenticates the given network device as a trusted network device, the digital certificate being previously issued to the given network device by the centralized security system upon the given network device registering with the centralized security system to operate within the network;

establishing a secured communications channel between the centralized security system and the given network device, in response to the centralized security system determining that the digital certificate received from the given network device is valid; receiving, by the centralized security system, a request from the given network device for the computing system to perform a requested operation, wherein the received request is encrypted using a session key issued by the centralized security system, and wherein the received request comprises device identifying information of the given network device;

extracting, by the centralized security system, the device identifying information from the encrypted request received from the given network device;

attempting, by the centralized security system, to validate an identity of the given network device based on the extracted device identifying information by comparing the extracted device identifying information against corresponding device identifying information associated with the digital certificate which was received from the given network device and deemed valid by the centralized security system;

sending, by the centralized security system, the received request to the computing system, responsive to determining that the given network device is valid based on the device identifying information in the received request;

denying the received request, by the centralized security system, in response to the identity of the given network device not being validated based on the extracted device identifying information; and invalidating the digital certificate of the given network device, which was issued by the centralized security system to the given network device, in response to the identity of the given network device not being validated based on the extracted device identifying information;

wherein the sensor devices operating within the network comprise wireless sensor devices operating in a wireless sensor network and wherein the computing system executes an IoT (Internet of Things) application using the data that is generated by the wireless sensor devices.

2. The method of claim 1, further comprising:
registering the centralized security system with the computing system; and
registering the plurality of network devices with the centralized security system.

3. The method of claim 2, wherein registering the centralized security system with the computing system comprises:
generating, by the centralized security system, a certificate signing request;
transmitting, by the centralized security system, the certificate signing request to the computing system; and
receiving, by the centralized security system, a digital certificate which authenticates an identity of the centralized security system and which is utilized to establish secured communications between the centralized security system and the computing system.

4. The method of claim 2, wherein registering the plurality of network devices with the centralized security system comprises:
receiving, by the centralized security system, a certificate signing request from a given network device requesting registration as a trusted network device; and
generating, by the centralized security system, a digital certificate, which authenticates an identity of the given network device as a trusted network device, and which is utilized to establish secured communications between the centralized security system and the given network device.

5. The method of claim 1, further comprising:
receiving, by the centralized security system, a request from a given network device to perform a requested operation;
processing, by the centralized security system, the received request to determine if the requested operation is trusted; and
denying, by the centralized security system, the received request to perform the requested operation, in response to determining that the requested operation is not trusted by the centralized security system.

6. The method of claim 1, further comprising: obtaining, by the centralized security system, a patch from the computing system; and the centralized security system automatically installing the patch in one or more of the network devices operating within the network.

7. An article of manufacture comprising a non-transitory processor-readable storage medium having stored therein program code of one or more software programs, wherein the program code is executable by one or more processors to implement a method comprising:
receiving, by a centralized security system which is configured to operate within a network as a security layer between a computing system and a plurality of network devices comprising sensor devices operating within the network, which collectively generate data that is utilized by a computing system, to manage security operations within the network and establish communications between the network devices and the computing system, device operational data which is streamed from a sensor device operating within the network, wherein the device operational data comprises information regarding at least one of power usage data and resource usage data as reported by the sensor device operating within the network;
processing, by the centralized security system, the device operational data to detect anomalous behavior of the sensor device operating within the network; automatically preventing, by the centralized security system, the sensor device from operating within the network and sending data to the computing system, in response to the detection of anomalous behavior of the sensor device;
controlling, by the centralized security system, access to the computing system by the plurality of network devices, wherein controlling access to the computing system comprises:
receiving, by the centralized security system, a digital certificate from a given network device requesting access to the computing system, wherein the digital certificate authenticates the given network device as a trusted network device, the digital certificate being previously issued to the given network device by the centralized security system upon the given network device registering with the centralized security system to operate within the network;

establishing a secured communications channel between the centralized security system and the given network device, in response to the centralized security system determining that the digital certificate received from the given network device is valid; receiving, by the centralized security system, a request from the given network device for the computing system to perform a requested operation, wherein the received request is encrypted using a session key issued by the centralized security system, and wherein the received request comprises device identifying information of the given network device;

extracting, by the centralized security system, the device identifying information from the encrypted request received from the given network device;

attempting, by the centralized security system, to validate an identity of the given network device based on the extracted device identifying information by comparing the extracted device identifying information against corresponding device identifying information associated with the digital certificate which was received from the given network device and deemed valid by the centralized security system;

sending, by the centralized security system, the received request to the computing system, responsive to determining that the given network device is valid based on the device identifying information in the received request;

denying the received request, by the centralized security system, in response to the identity of the given network device not being validated based on the extracted device identifying information; and invalidating the digital certificate of the given network device, which was issued by the centralized security system to the given network device, in response to the identity of the given network device not being validated based on the extracted device identifying information;

wherein the sensor devices operating within the network comprise wireless sensor devices operating in a wireless sensor network and wherein the computing system executes an IoT (Internet of Things) application using the data that is generated by the wireless sensor devices.

8. The article of manufacture of claim 7, further comprising executable program code for:

registering the centralized security system with the computing system; and registering the plurality of network devices with the centralized security system.

9. The article of manufacture of claim 8, wherein the executable program code for registering the centralized security system with the computing system comprises executable program code for:

generating, by the centralized security system, a certificate signing request;

transmitting, by the centralized security system, the certificate signing request to the computing system; and receiving, by the centralized security system, a digital certificate which authenticates an identity of the centralized security system and which is utilized to establish secured communications between the centralized security system and the computing system.

10. The article of manufacture of claim 8, wherein the executable program code for registering the plurality of network devices with the centralized security system comprises executable program code for:

receiving, by the centralized security system, a certificate signing request from a given network device requesting registration as a trusted network device; and generating, by the centralized security system, a digital certificate, which authenticates an identity of the given network device as a trusted network device, and which is utilized to establish secured communications between the centralized security system and the given network device.

11. The article of manufacture of claim 7, further comprising executable program code for:

receiving, by the centralized security system, a request from a given network device to perform a requested operation;

processing, by the centralized security system, the received request to determine if the requested operation is trusted; and denying, by the centralized security system, the received request to perform the requested operation, in response to determining that the requested operation is not trusted by the centralized security system.

12. The article of manufacture of claim 7, further comprising executable program code for:

obtaining, by the centralized security system, a patch from the computing system; and the centralized security system automatically installing the patch in one or more of the network devices operating within the network.

13. A system, comprising:

at least one processor; and system memory configured to store program code, wherein the program code is executable by the at least one processor to execute a process comprising: receiving, by a centralized security system which is configured to operate within a network as a security layer between a computing system and a plurality of network devices comprising sensor devices operating within the network, which collectively generate data that is utilized by a computing system, to manage security operations within the network and establish communications between the network devices and the computing system, device operational data which is streamed from a sensor device operating within the network, wherein the device operational data comprises information regarding at least one of power usage data and resource usage data as reported by the sensor device operating within the network;

processing, by the centralized security system, the device operational data to detect anomalous behavior of the sensor device operating within the network; automatically preventing, by the centralized security system, the sensor device from operating within the network and sending data to the computing system, in response to the detection of anomalous behavior of the sensor device;

controlling, by the centralized security system, access to the computing system by the plurality of network devices, wherein controlling access to the computing system comprises:

receiving, by the centralized security system, a digital certificate from a given network device requesting access to the computing system, wherein the digital certificate authenticates the given network device as a trusted network device, the digital certificate being previously issued to the given network device by the centralized security system upon the given network device registering with the centralized security system to operate within the network;

establishing a secured communications channel between the centralized security system and the given network device, in response to the centralized security system determining that the digital certificate received from the given network device is valid; receiving, by the centralized security system, a request from the given network device for the computing system to perform a requested operation, wherein the received request is encrypted using a session key issued by the centralized security system, and wherein the received request comprises device identifying information of the given network device;

extracting, by the centralized security system, the device identifying information from the encrypted request received from the given network device;

attempting, by the centralized security system, to validate an identity of the given network device based on the extracted device identifying information by comparing the extracted device identifying information against corresponding device identifying information associated with the digital certificate which was received from the given network device and deemed valid by the centralized security system;

sending, by the centralized security system, the received request to the computing system, responsive to determining that the given network device is valid based on the device identifying information in the received request;

denying the received request, by the centralized security system, in response to the identity of the given network device not being validated based on the extracted device identifying information; and invalidating the digital certificate of the given network device, which was issued by the centralized security system to the given network device, in response to the identity of the given network device not being validated based on the extracted device identifying information;

wherein the sensor devices operating within the network comprise wireless sensor devices operating in a wireless sensor network and wherein the computing system executes an IoT (Internet of Things) application using the data that is generated by the wireless sensor devices.

14. The system of claim 13, wherein the program code is executable by the at least one processor to execute a process comprising:
registering the centralized security system with the computing system; and
registering the plurality of network devices with the centralized security system.

15. The system of claim 14, wherein the process executed by the at least one processor for registering the centralized security system with the computing system comprises:
generating, by the centralized security system, a certificate signing request;
transmitting, by the centralized security system, the certificate signing request to the computing system; and
receiving, by the centralized security system, a digital certificate which authenticates an identity of the centralized security system and which is utilized to establish secured communications between the centralized security system and the computing system.

16. The system of claim 14, wherein the process executed by the at least one processor for registering the plurality of network devices with the centralized security system comprises:
receiving, by the centralized security system, a certificate signing request from a given network device requesting registration as a trusted network device; and
generating, by the centralized security system, a digital certificate, which authenticates an identity of the given network device as a trusted network device, and which is utilized to establish secured communications between the centralized security system and the given network device.

17. The system of claim 13, wherein the program code is executable by the at least one processor to execute a process comprising:
obtaining, by the centralized security system, a patch from the computing system; and
the centralized security system automatically installing the patch in one or more of the network devices operating within the network.

* * * * *